(12) United States Patent
Palumbo

(10) Patent No.: US 8,021,471 B2
(45) Date of Patent: Sep. 20, 2011

(54) MODIFIED COLORANTS WITH ALIPHATIC POLY-ACID GROUPS

(75) Inventor: Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 423 days.

(21) Appl. No.: 11/895,726

(22) Filed: Aug. 27, 2007

(65) Prior Publication Data

US 2008/0083347 A1    Apr. 10, 2008

Related U.S. Application Data

(60) Provisional application No. 60/840,533, filed on Aug. 28, 2006.

(51) Int. Cl.
*C09D 11/00* (2006.01)
(52) U.S. Cl. .................. 106/31.58; 106/31.86
(58) Field of Classification Search .......... 106/31.58, 106/31.86
See application file for complete search history.

(56) References Cited

U.S. PATENT DOCUMENTS

| | | |
|---|---|---|
| 5,554,739 A | 9/1996 | Belmont |
| 5,571,311 A | 11/1996 | Belmont |
| 5,609,671 A | 3/1997 | Nagasawa |
| 5,630,868 A | 5/1997 | Belmont et al. |
| 5,672,198 A | 9/1997 | Belmont |
| 5,707,432 A | 1/1998 | Adams et al. |
| 5,803,959 A | 9/1998 | Johnson et al. |
| 5,830,265 A | 11/1998 | Tsang et al. |
| 5,837,045 A | 11/1998 | Johnson et al. |
| 5,851,280 A | 12/1998 | Belmont et al. |
| 5,885,335 A | 3/1999 | Adams et al. |
| 5,922,118 A | 7/1999 | Johnson et al. |
| 5,976,233 A | 11/1999 | Osumi et al. |
| 5,985,016 A | 11/1999 | Tsang et al. |
| 6,042,643 A | 3/2000 | Belmont et al. |
| 6,221,142 B1 | 4/2001 | Wang et al. |
| 6,328,894 B1 | 12/2001 | Chan et al. |
| 6,398,858 B1 | 6/2002 | Yu et al. |
| 6,436,178 B1 | 8/2002 | Hosmer |
| 6,494,943 B1 | 12/2002 | Yu et al. |
| 6,506,245 B1 | 1/2003 | Kinney et al. |
| 6,641,656 B2 | 11/2003 | Yu et al. |
| 6,699,319 B2 | 3/2004 | Adams et al. |
| 6,706,105 B2 | 3/2004 | Takada et al. |
| 6,723,783 B2 | 4/2004 | Palumbo et al. |
| 6,740,151 B2 | 5/2004 | Belmont et al. |
| 6,822,781 B1 | 11/2004 | Amici et al. |
| 6,916,367 B2 | 7/2005 | Palumbo |
| 7,025,820 B2 | 4/2006 | Champlin et al. |
| 7,223,302 B2 | 5/2007 | Shakhnovich |
| 7,579,080 B2 | 8/2009 | Vasudevan |
| 2002/0147252 A1 | 10/2002 | Adams |
| 2005/0066856 A1 | 3/2005 | Lee et al. |
| 2006/0089422 A1 | 4/2006 | Vasudevan |

FOREIGN PATENT DOCUMENTS

EP    1650269 A2 *  4/2006
WO   WO 03095568 A1 * 11/2003

* cited by examiner

*Primary Examiner* — Jerry A Lorengo
*Assistant Examiner* — Veronica F Faison

(57) ABSTRACT

Modified colorants which can be pigments or dyes are described wherein the colorant has attached at least one aliphatic poly-acid group. Ink and inkjet ink compositions, formulations, and systems are further described, as well as methods of generating a printed image.

19 Claims, No Drawings

MODIFIED COLORANTS WITH ALIPHATIC POLY-ACID GROUPS

CROSS-REFERENCE TO RELATED APPLICATIONS

This patent application claims the benefit of U.S. Provisional Patent Application No. 60/840,533, filed Aug. 28, 2006.

BACKGROUND OF THE INVENTION

1. Field of the Invention

The present invention relates to colorants, such as pigments, as well as the use of the colorants in ink and inkjet ink compositions or formulations, as well as methods of forming images using the ink or inkjet ink formulations.

2. Description of the Related Art

An ink or inkjet ink composition generally contains a vehicle, which functions as a carrier, and a colorant such as a dye or pigment. Additives and/or cosolvents can also be incorporated in order to adjust the ink or inkjet ink to attain the desired overall performance properties.

In general, pigments alone are not readily dispersible in liquid vehicles. A variety of techniques have been developed providing stable pigment dispersions that can be used in inkjet printing. For example, dispersants can be added to the pigment to improve its dispersibility in a particular medium. Examples of dispersants include water-soluble polymers and surfactants.

Modified pigments have also been developed which provide ink compositions with improved properties, such as dispersibility, without the need for an external dispersant. For example, U.S. Pat. No. 5,851,280 discloses methods for the attachment of organic groups to pigments including, for example, attachment via a diazonium reaction wherein the organic group is part of the diazonium salt. The resulting surface-modified pigments can be used in a variety of applications, such as inks, inkjet inks, coatings, toners, plastics, rubbers, and the like. These modified pigments provide inkjet inks with good overall properties.

It is always highly desirable for inks, such as inkjet inks, like black inkjet ink, to have very high optical density (OD) on a variety of papers, such as plain papers. Obtaining optical density on a variety of papers can be a challenge considering the variation in quality of papers, such as inkjet papers in the market today. Further, there are a variety of factors that can affect optical density on paper.

Accordingly, a need exists for colorants, like pigments, and ink compositions, such as inkjet compositions, that provide or afford good optical density when an image is created from an ink formulation.

SUMMARY OF THE PRESENT INVENTION

It is therefore a feature of the present invention to provide colorants (e.g., pigments) which can be incorporated into ink formulations, such as inkjet ink formulations.

Another feature of the present invention is to provide ink formulations, such as inkjet ink formulations, which provide high optical density with respect to the images printed or formed on paper.

A further feature of the present invention is to provide modifications of colorants, like pigments, which improve optical density of ink images on plain paper or other paper.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a modified colorant comprising a colorant, such as a pigment, having attached at least one aliphatic poly-acid group. The aliphatic poly-acid group can have a pKa value of from 2 to 7.5 for each acid group present on the aliphatic poly-acid group. For instance, the aliphatic poly-acid group can comprise at least two carboxylic acid groups.

The present invention further relates to an inkjet ink system or formulation comprising at least one liquid vehicle and at least one modified colorant described herein.

Further, the present invention relates to a method of generating a printed image that comprises incorporating into a printing apparatus the inkjet ink system or formulation of the present invention and generating an image onto a substrate.

The present invention further relates to, more generally, ink systems and methods of generating printed images using the ink systems of the present invention which contain the modified colorant of the present invention.

It is to be understood that both the foregoing general description and the following detailed description are exemplary and explanatory only and are intended to provide a further explanation of the present invention, as claimed.

DETAILED DESCRIPTION OF THE PRESENT INVENTION

The present invention relates to colorants, ink compositions, including inkjet ink compositions, and methods of forming or generating printed images using the ink or inkjet ink formulations of the present invention.

More particularly, the present invention relates to a modified colorant that comprises a colorant having attached at least one aliphatic poly-acid group.

For purposes of the present invention, the colorant can be any type of colorant capable of having attached at least one aliphatic poly-acid group. For instance, the colorant can be a dye or a pigment. Preferably the colorant is a pigment, and the modified colorant is a modified pigment.

The pigment can be any type of pigment conventionally used by those skilled in the art, such as carbonaceous black pigments and organic colored pigments including pigments comprising a blue, black, brown, cyan, green, white, violet, magenta, red, orange, or yellow pigment. Representative examples of black pigments include various carbon blacks (Pigment Black 7) such as channel blacks, furnace blacks and lamp blacks, and include, for example, carbon blacks, such as the brands the Regal®, Black Pearls®, Elftex®, Monarch®, Mogul@, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation and Sun Chemical Corporation. Examples of other suitable colored pigments are described in the Colour Index, 3rd edition (The Society of Dyers and Colourists, 1982). Preferably the pigment is a cyan, magenta, or yellow organic pigment or a carbonaceous black pigment, such as carbon black.

The pigment can have a wide range of BET surface areas, as measured by nitrogen adsorption, depending on the desired properties of the pigment. If the desired surface area is not readily available for the desired application, it is also well recognized by those skilled in the art that either or both of these pigments may be subjected to conventional size reduction or communication techniques, such as ball or jet milling or sonication, to reduce the pigment to a smaller particle size, if desired.

The dye of the modified colorant may be any of those known in the art, particularly those to which at least one organic group may be attached. Thus, the dye can be selected from an acid dye, a basic dye, a direct dye, a disperse dye, or a reactive dye. Combinations of dyes may also be used in order to form different shades. Examples of acid dye include, but are not limited to, Acid Red 18, Acid Red 27, Acid Red 52, Acid Red 249, Acid Red 289, Acid Blue 9, Acid Yellow 23, Acid Yellow 17, Acid Yellow 23, and Acid Black 52. Examples of basic dyes include, but are not limited to, Basic Red 1, Basic Blue 3, and Basic Yellow 13. Examples of direct dyes include, but are not limited to, Direct Red 227, Direct Blue 86, Direct Blue 199, Direct Yellow 86, Direct Yellow 132, Direct Yellow 4, Direct Yellow 50, Direct Yellow 132, Direct Yellow 104, Direct Black 170, Direct Black 22, Direct Blue 199, Direct Black 19, and Direct Black 168. Examples of reactive dyes include, but are not limited to, Reactive Red 180, Reactive Red 31, Reactive Red 29, Reactive Red 23, Reactive Red 120, Reactive Blue 49, Reactive Blue 25, Reactive Yellow 37, Reactive Black 31, Reactive Black 8, Reactive Green 19, and Reactive Orange 84. Other types of dyes can also be used, including, for example, Yellow 104 and Magenta 377.

With respect to the aliphatic poly-acid group, any aliphatic poly-acid group can be attached to the colorant. The aliphatic poly-acid group can be part of a larger group, such as an organic group, that is attached to the colorant. For instance, the aliphatic poly-acid group can be bonded to at least one aromatic group, wherein the aliphatic poly-acid group that is bonded to at least one aromatic group is attached to the colorant. As an option, the aromatic group (or an alkyl group) can be directly attached to the colorant.

In one or more embodiments, the aliphatic poly-acid group can have a pKa value of from 2 to 7.5 for each acid group that is present or that forms a part of the aliphatic poly-acid group. The pKa value can be from about 3 to about 7, such as from 3.5 to about 6. The one or more acid groups present as part of the aliphatic poly-acid group can have pKa values outside of these ranges. The pKa values can be the same or different for each acid group present.

As an example, the aliphatic poly-acid group can comprise at least two acid groups, at least three, four, or more acid groups, such as at least two carboxylic acid groups, at least three or more carboxylic groups, as well as other types of acid groups in addition or in the alternative. The aliphatic poly-acid group can contain a $C_1$-$C_{20}$ aliphatic group, such as a $C_3$-$C_{15}$ aliphatic group, a $C_2$-$C_{10}$ aliphatic group, and the like.

Particular examples of the aliphatic poly-acid group, or portion thereof, can be as follows. For example, the aliphatic poly-acid group, or portion thereof, can comprise one of the following formulas:

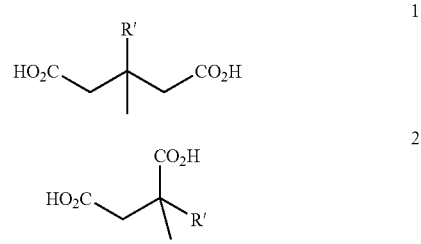

wherein R' is hydrogen, —$CO_2H$, a bond (to be attached to other chemical groups), phenyl (or aromatic) group, or an aliphatic group. Specific examples of aliphatic poly-acid groups are the following groups:

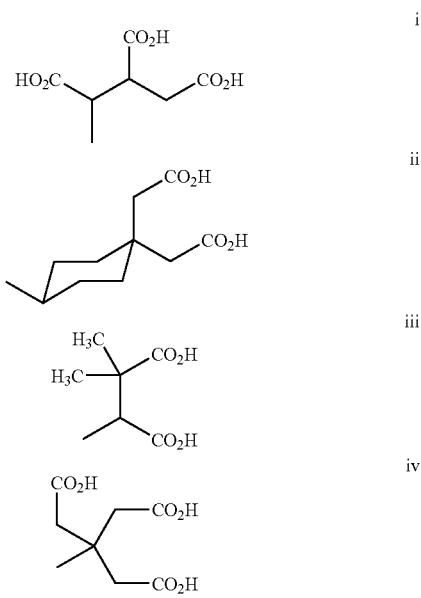

The open bond site in the formula can be attached to any organic group, such as an aromatic group or alkyl group, which can be directly attached to the colorant, such as the pigment. Specific examples of phenyl groups include, but are not limited to, phenyl, naphthyl, or pyridyl. Specific examples of alkyl groups include, but are not limited to, $C_1$-$C_{10}$ alkyl group, such as ethyl and propyl. As an option, one or more heteroatoms can be present in the aromatic or alkyl group, such as sulfur or nitrogen.

As more specific examples, the aliphatic poly-acid group can be a phenyl-succinic acid, a phenyl-tricarballylic acid, a phenyl-glutaric acid, and/or a homophthalic acid, or mixtures thereof. More specifically, the aliphatic poly-acid group can be a 4-phenyl-succinic acid, a 3-(4 phenyl)-tricarballylic acid, a 3-(4-phenyl)-glutaric acid, and/or a 4-homophthalic acid, or mixtures thereof.

As further examples, the aliphatic poly-acid group can comprise or be one of the following groups:

A 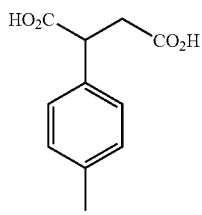

B 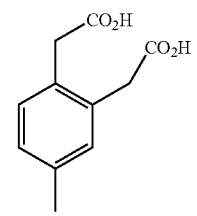

C 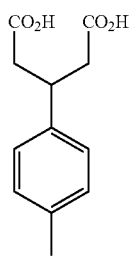

D 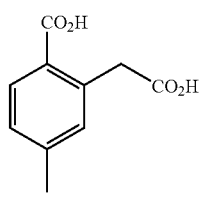

E 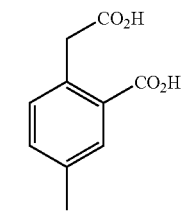

F 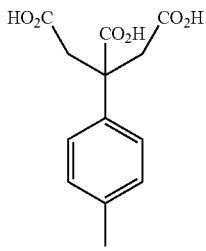

G 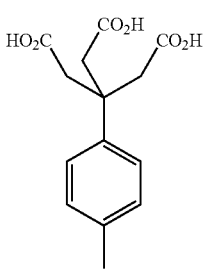

H 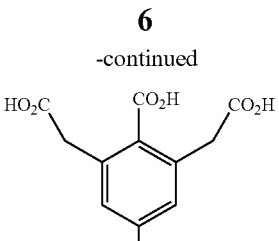

I 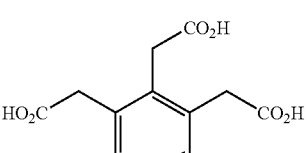

J 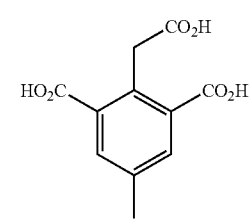

K 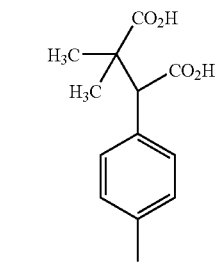

wherein the open bond site represents a bond where attachment to the colorant, e.g., pigment, is occurring. For purposes of the invention, groups A through K are considered aliphatic poly-acid groups.

For purposes of the present invention, the term aliphatic poly-acid group includes salts thereof or ionic forms thereof. The salt form or ionic form can especially be present in inks, such as aqueous inks. Examples of salt forms include, but are not limited to, monovalent cations, like sodium, potassium, lithium, cesium, ammonium, and the like.

The aliphatic poly-acid groups that are used in the present invention can be obtained commercially or can be made according to various literature known to those skilled in the art. For example, Takuma Teshirogi, "*Polyimides from 4-Aminophenylsuccinic Acid and 3-(4-Aminophenyl)glutaric Acid*," Journal of Polymer Science: Part A: Polymer Chemistry, Vol. 26, 3403-3407 (1988), which is incorporated in its entirety by reference herein, describes methods to make aliphatic poly-acids. Another pathway for making various aliphatic poly-acid groups for use in the present invention is by way of nitration, such as, in a particular example, nitration of phenyl succinic acid followed by reduction. Another example is the nitration of homophthalic acid followed by catalytic reduction, for instance, with Pd—C. In general, many of the aliphatic poly-acid groups can be obtained by conducting a nitration followed by a suitable reduction, such as with a catalyst. Particular reaction schemes are set forth in the Examples and can be adjusted based on the particular aliphatic poly-acid group desired for purposes of the present invention.

For purposes of the present invention, more than one type of aliphatic poly-acid group can be present on the colorant, such as two different aliphatic poly-acid groups, and the like. In addition, for purposes of the present invention, other chemical groups, such as organic groups, can be separately attached (or otherwise present) to the colorant in addition to the at least one aliphatic poly-acid group. Also, as an option various mixtures can be used, such as a mixture of two or more different colorants having different chemical groups attached, wherein at least one of the colorants has attached an aliphatic poly-acid group. Mixtures of colorants having different aliphatic poly-acid groups attached can be used.

For purposes of the present invention, the at least one aliphatic poly-acid group or group containing at least one aliphatic poly-acid group can be attached, such as by chemical attachment (e.g., bonding), to the colorant. This attachment, as stated above, can be a direct attachment of an aromatic group or alkyl group to the colorant, such as a pigment.

A method that can be used to attach a group containing at least one aliphatic poly-acid group to the colorant can be a diazonium treatment as detailed, for instance, in the following patents: U.S. Pat. Nos. 6,852,158; 6,664,312; 6,551,393; 6,534,569; 6,372,820; 6,368,239; 6,350,519; 6,337,358; and 6,103,380. These patents describe methods for the attachment of organic groups to colorants, such as pigments, by way of an attachment via a diazonium reaction where the organic group can be part of the diazonium salt. For purposes of at least one embodiment of the present invention, the amount of organic group attached to the colorant (e.g. carbon black) can be helpful for purposes of the subsequent use of the modified colorant in such applications as ink jet ink compositions, coating formulations, and ink systems. In particular, the levels can be any treatment level and can be a low level. The treatment levels of organic group may be from about 0.10 to about 4.0 micromoles/m$^2$ of the colorant (e.g. carbon black) used, preferably from about 0.1 to 2.0 or from 0.2 to 2.0, or from 0.4 to 1.5 micromoles/m$^2$ based on nitrogen surface area of the colorant.

Also, groups, such as those shown above, can be attached via subsequent reaction chemistry, such as described in U.S. Pat. No. 6,723,783 B2, incorporated in its entirety by reference herein.

In addition, the patents set forth above provide examples of other organic groups that can be additionally present, as an option, with the aliphatic poly-acid groups.

The ink compositions of the present invention may be prepared utilizing conventional techniques known to those skilled in the art, such as combining or mixing the desired components in a suitable medium. The ink compositions can be aqueous systems and can include therein a significant amount of water, for instance, deionized or distilled water. For example, the amount of water or similar medium can be present in an amount ranging from about 30% to about 95%, preferably from about 75% to about 90%, based on the weight of the ink composition.

The modified colorants of this invention are particularly useful in aqueous or non-aqueous ink formulations. Thus, the invention provides an improved ink composition comprising water and a modified colorant according to the present invention. Other known ink additives may be incorporated into the ink formulation.

In general, an ink may consist of four basic components: (1) a colorant, e.g., pigment, (2) a vehicle or varnish which functions as a carrier during printing, (3) additives to improve printability, durability, drying, and the like, and (4) solvents to adjust viscosity, drying and the compatibility of the other ink components. For a general discussion on the properties, preparation and uses of inks, see The Printing Manual, 5th Ed., Leach et al, Eds. (Chapman and Hall, 1993), incorporated herein by references. Various ink compositions are also disclosed, for example, in U.S. Pat. Nos. 2,833,736, 3,607,813, 4,104,833, 4,308,061, 4,770,706, and 5,026,755, all incorporated herein by reference.

The modified colorants of the present invention, either as a predispersion or as a solid, can be incorporated into an ink formulation using standard techniques. Use of a water dispersible modified colorant of the present invention provides a significant advantage and cost savings by reducing or eliminating the milling steps generally used with conventional colorants.

Flexographic inks represent a group of ink compositions. Flexographic inks generally include a colorant, a binder, and a solvent. The modified colorants of the present invention can be useful as flexographic ink colorants.

The modified colorants of the present invention can be used in news inks. For example, an aqueous news ink composition may comprise water, the modified colorants of the present invention, a resin and conventional additives such as antifoam additives or a surfactant.

The modified colorants of this invention may also be used in coating compositions such as paints or finishes. Thus, an embodiment of the present invention is an aqueous or non-aqueous coating composition comprising solvent, resin, and a modified colorant according to the present invention. Other known coating additives may be incorporated in the coating composition. See, for example, McGraw-Hill Encyclopedia of Science & Technology, 5th Ed. (McGraw-Hill, 1982), incorporated herein by reference. See also U.S. Pat. Nos. 5,051,464, 5,319,044, 5,204,404, 5,051,464, 4,692,481, 5,356,973, 5,314,945, 5,266,406, and 5,266,361, all incorporated herein by reference. The modified colorants of the present invention, either as a predispersion or as a solid, can be incorporated into a coating composition using standard techniques.

In inks and coatings of the present invention, the modified colorants can be present in an amount of less than or equal to 40% by weight of the ink or coating (e.g., 1% to 40% by weight). It is also within the bounds of the present invention to use an ink or coating formulation containing a mixture of unmodified colorant(s) with the modified colorants of the present invention. Common additives such as those discussed below may be added to the dispersion to further improve the properties of the aqueous ink or coating.

The colorant, e.g., pigment, can be present in the inkjet ink composition in an amount effective to provide the desired image quality (for example, optical density) without detrimentally affecting the performance of the inkjet ink. Typically, the total amount of colorant, e.g., pigment, is an amount ranging from about 0.1% to about 30% based on the weight of the ink. More or less colorant, e.g., pigment, may be used depending on a variety of factors. For example, the amount of pigment may vary depending on the amount of attached group, particularly when the organic group has a high molecular weight.

The inkjet ink composition of the present invention can be formed with a minimum of additional components (additives and/or cosolvents) and processing steps. However, suitable additives may be incorporated in order to impart a number of desired properties while maintaining the stability of the compositions. For example, surfactants and/or dispersants, humectants, drying accelerators, penetrants, biocides, binders, and pH control agents, as well as other additives known in the art, may be added. The amount of a particular additive will vary depending on a variety of factors but generally ranges between 0% and 40 wt %, by weight of the ink.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be in solid form or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkyl-sulfosuccinates, naphthenates, alkylether carboxylates, acylated peptides, α-olefin sulfonates, N-acryl-methyl taurine, alkylether sulfonates, secondary higher alcohol ethoxysulfates, polyoxyethylene alkylphenylether sulfates, monoglycylsulfates, alkylether phosphates and alkyl phosphates. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad®19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.), Brij® Series materials (ICI Americas, Inc.), and Triton® series materials (Union Carbide Company). These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols; polyvinylpyrrolidones; acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(metha)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol, 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cylcopropanol; amides such as dimethyl formaldehyde and dimethyl acetamide; ketones or ketoalcohols such as acetone and diacetone alcohol; ethers such as tetrahydrofurane and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1- propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propyl-carboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidene; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols, hydroxypropylenecellulose, hydroxyethylcellulose, polyvinylpyrrolidinone, polyvinylether, starch, polysaccharides, polyethyleneimines with or without being derivatized with ethylene oxide and propylene oxide including the Discole® series (DKS International); the Jeffamine® series (Texaco); and the like. Additional examples of water-soluble polymer compounds include various dispersants or surfactants described above, including, for example, styrene-acrylic acid copolymers, styrene-acrylic acid-alkyl acrylate terpolymers, styrene-methacrylic acid copolymers, styrene-maleic acid copolymers, styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers or may be a water dispersible polyurethane.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an OH— ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH— ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate conventional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink composition or other compositions can be purified and/or classified using various methods. The modified pigments may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. Dispersions of the pigments may be further purified or classified to remove impurities and other undesirable free species which can co-exist in the dispersion as a result of the manufacturing process. For example, the dispersion can be purified to remove any undesired free species, such as unreacted treating agent. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, and $Mg^{2+}$.

Each of the above additives and other options relating to inkjet ink compositions equally applies to ink and coating compositions.

The present application, using the modified colorants with aliphatic poly-acid groups, can provide ink formulations, such as inkjet ink formulations, that have the ability to provide excellent optical density of ink images when printed on paper, such as plain paper or other paper. The optical density achieved with the modified colorants of the present invention is comparable to other ink formulations considered to have high optical density. This is further shown in the Examples of the present application. Other property improvements, such as intercolor bleed, edge acuity, and rub resistance can additionally or alternatively be achieved with the modified colorants of the present invention when formulated into ink formulations, such as inkjet ink formulations.

The present invention will be further clarified by the following examples, which are intended to be exemplary of the present invention.

EXAMPLES

All raw materials were obtained from either Aldrich Chemical Company or Acros Organics and used without further purification. Potassium carbonate was ground to a fine powder in a mortar and pestle and then dried under high vacuum while it was heated with a high temperature heat gun. Normal phase silica TLC plates (NP-TLC) were obtained from Fisher (Baker-Flex 2.5×7.5 cm Silica Gel IB—F, plastic-backed TLC plates) and C-18 reversed phase TLC plates (RP-TLC) from Merck (5×10 cm glass-backed RP-18 $F_{254s}$).

$R_f$ is reported as elution distance divided by the solvent front elution distance. Elution solvent is listed for each compound. Spots were visualized by UV irradiation. All glassware was previously flushed with a stream of dry nitrogen. All water used was de-ionized to a resistivity>4 mega ohms. All NMR spectra were acquired using a 400 MHz Varian FT-NMR, in the listed solvent.

Example 1

Synthesis of 4-Aminophenylsuccinic Acid (Compound A)

In this example, the route shown in Scheme 2 below was followed, although, the route shown in Scheme 1 can also be used.

Scheme 1

Takuma Teshirogi, "Polyimides from 4-Aminophenylsuccinic Acid and 3-(4-Aminophenyl)glutaric Acid", Journal of Polymer Science: Part A: Polymer Chemistry, Vol. 26, 3403-3407 (1988).

Scheme 2

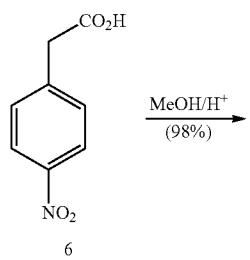

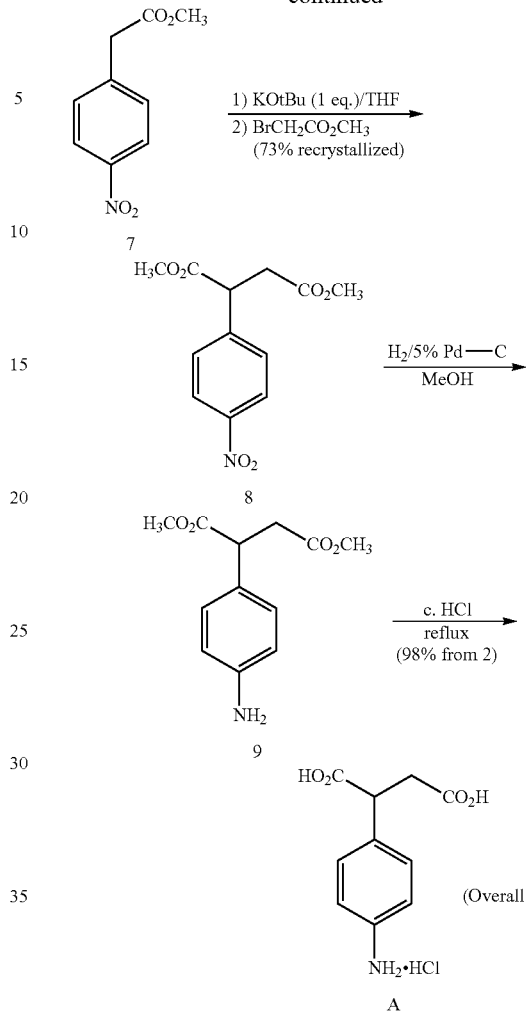

Step 1: Methyl 4-Nitrophenylacetate (Compound 7)

4-Nitrophenyl acetic acid (104.4 g/0.57 mol) was dissolved in absolute methanol (1 L) and refluxed with a trace amount of concentrated sulfuric acid (20 ml) for 2 hours (protected from atmospheric moisture with a calcium sulfate drying tube). The resultant mixture was then cooled to room temperature, concentrated on the rotary evaporator, then taken in methylene chloride and washed with 10% sodium carbonate. The organic phase was dried over anhydrous sodium sulfate and evaporated in vacuo to afford 108 g of compound 7 which crystallized in a mass. (98% yield). $^1$H NMR (d$_6$-DMSO): δ 8.19 (d, J=7.6 Hz, 2H), 7.56 (d, J=7.6 Hz, 2H), 3.90 (s, 2H), 3.64 (s, 3H). NP-TLC (CH$_2$Cl$_2$): $R_f$~0.8.

Step 2: Dimethyl 2-(4-Nitrophenyl)Succinate (Compound 8)

Compound 7 (16.3 g/0.0834 mol) was then dissolved in dry THF (160 ml) and cooled in an ice bath under an atmosphere of nitrogen. To this stirred solution was added 1.2 equivalents of potassium t-butoxide (11.23 g/0.10 mol) and then 1.2 equivalents of methyl bromoacetate (9.5 ml/0.10 mol). The resultant deep purple solution was stirred at 0-5° C. for 30 minutes and then at room temperature (~25° C.) for 1 hour. The solution was then worked-up by extraction into ethyl acetate and washed with 1N HCl. After evaporation of the solvent, the crude product was recrystallized from 2-propanol to afford pure compound 8. (73% yield). $^1$H NMR (d$_6$-DMSO): δ 8.19 (d, J=4 Hz, 2H), 7.71 (d, J=4 Hz, 2H), 4.29 (dd, J=10 Hz, 6.0 Hz, 1H), 3.60 (s, 3H), 3.59 (s, 3H), 3.14 (dd, J=16 Hz, 10 Hz, 1H), 2.81 (dd, J=16 Hz, 6 Hz, 1H). NP-TLC (CH$_2$Cl$_2$): R$_f$~0.66.

Alternatively, the reaction may be carried out in DMF, at room temperature, with an excess of potassium carbonate and 1 equivalent of methyl bromoacetate. Thus, compound 7 and 5-10 moles of finely ground, anhydrous potassium carbonate were combined in dry DMF (1 g compound 7 in 20 ml DMF), at room temperature, under nitrogen. To this stirred solution was added 1.0 equivalents of methyl bromoacetate. The resulting mixture was stirred rapidly under nitrogen for 5 hours or until TLC indicated complete disappearance of starting material. The solution was filtered to remove excess carbonate and washed with ethyl acetate. The ethyl acetate was then washed with 1N HCl (2×), brine (1×), then dried over magnesium sulfate (anh); the volatiles were removed in vacuo and the resulting residue was recrystallized from isopropyl alcohol. Yield=77%.

Step 3: Dimethyl 2-(4-Aminophenyl)Succinate (Compound 9)

Compound 8 (0.73 g/0.0027 mmol) was then dissolved in 20 ml absolute methanol/2 ml THF and placed in a 500 ml Parr bottle. The bottle was flushed with nitrogen gas and then ~200 mg 5% Pd—C added as catalyst. The resultant mixture was hydrogenated in a Parr Hydrogenator for 1 hour at ~40 psi hydrogen. The initial uptake of hydrogen was rapid. The excess catalyst was removed by suction filtration through Celite, the filter cake washed with methanol and the filtrate evaporated in vacuo. The product crystallizes to afford 0.63 g of an off-white solid (97% yield). This compound was used without further purification. $^1$H NMR (d$_6$-DMSO): δ 6.9 (d, J=4.4 Hz, 2H), 6.49 (d, J=4.4 Hz, 2H), 5.02 (s, 2H, —NH$_2$), 3.81 (dd, J=11 Hz, 6 Hz, 1H), 3.56 (s, 3H), 3.55 (s, 3H), 2.99 (dd, J=11 Hz, 17 Hz, 1H), 2.59 (dd, J=17 Hz, 6 Hz, 1H). NP-TLC (CH$_2$Cl$_2$): R$_f$~0.1; NP-TLC (1% CH$_3$OH in CH$_2$Cl$_2$): R$_f$~0.6; RP-TLC (1:1 CH$_3$OH—H$_2$O): R$_f$~0.5.

Step 4: 4-Aminophenylsuccinic Acid (Compound A)

Compound 9 (0.55 g/0.00232 mol) was then dissolved in excess concentrated HCl (5 ml) and refluxed for 5 hours. Excess HCl gas which is evolved during the initial reflux was trapped in a water trap. Upon evaporation and drying, compound A was obtained as a tan powder: 0.57 g (100% yield). $^1$H NMR (d$_6$-DMSO): δ 11-10 (broad), 7.38 (d, J=8 Hz, 2H), 7.32 (d, J=8 Hz, 2H), 3.94 (m, 1H), 2.94 (m, 1H), 2.55 (m, 1H); IR (KBr): 3450 (br), 3070 (br), 1720 (s) cm$^{-1}$; EI-MS (m/z) 208.3 (M$^+$); MS/MS 164.1. RP-TLC (1:1 CH$_3$OH—H$_2$O): R$_f$~0.9 (during the course of the reaction, the monoacid can be observed at R$_f$~0.75).

Example 2

Synthesis of 3-(4-Aminophenyl)-Tricarballylic Acid (Compound F)

In this example, the route shown in Scheme 3 was followed.

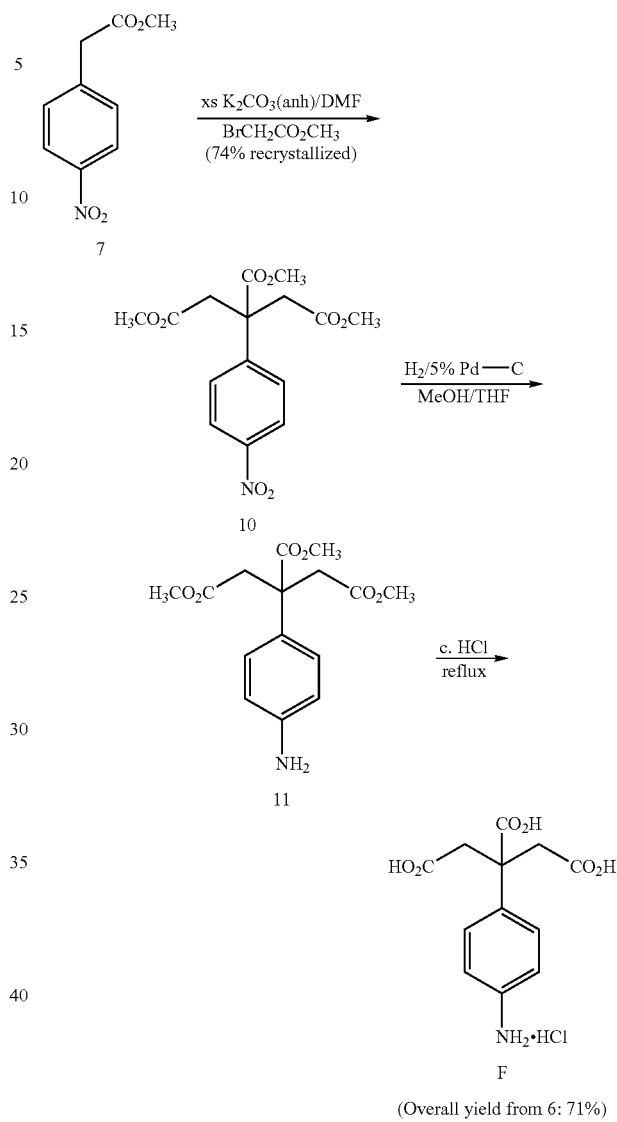

Scheme 3

Step 1: Trimethyl 3-(4-nitrophenyl)-tricarballylate (Compound 10)

A solution of compound 7 (26 g/0.133 mol) in dry DMF (400 ml) was placed in a 1 L RB flask, under an atmosphere of dry nitrogen. To this stirred solution was added finely ground, anhydrous potassium carbonate (143 g/1.035 mol) and then methyl bromoacetate (29.1 ml/0.306 mol). The resultant mixture was stirred rapidly, at room temperature, overnight or until TLC analysis revealed complete conversion to the dialkylated product. The reaction mixture was suction filtered, washed with excess ethyl acetate and then the filtrate transferred to a separatory funnel. The organic phase was washed with 1N HCl (3×200 ml), brine (1×200 ml), then dried over anhydrous magnesium sulfate. Solvent was removed on the rotary evaporator to afford the product which crystallized: 44 g. Pure product was obtained as microcrystals by recrystallization from isopropyl alcohol: 33.2 g (74% yield). $^1$H NMR (d$_6$-DMSO): δ 8.19 (d, J=8.5 Hz, 2H), 7.63 (d, J=8.5 Hz, 2H), 3.62 (s, 3H), 3.52 (s, 6H), 3.39 (d, J=17.6

Hz, 2H), 3.28 (d, J=17.6 Hz, 2H). NP-TLC (CH$_2$Cl$_2$): R$_f$~0.5 (during the course of the reaction, the monoalkylated intermediate can be observed at R$_f$~0.6).

Step 2: Trimethyl 3-(4-aminophenyl)-tricarballylate (Compound 11)

Compound 10 (12.4 g/0.0366 mol) was then dissolved in a mixture of 100 ml methanol and 40 ml THF and placed in a 500 ml Parr bottle. The bottle was flushed with nitrogen gas and then 5% Pd—C catalyst (~250 mg) was added in one portion. The resultant mixture was hydrogenated in a Parr Hydrogenator for 30 minutes at ~40 psi hydrogen. The initial uptake of hydrogen was rapid. The excess catalyst was then removed by suction filtration through Celite, the filter cake washed with methanol and the filtrate evaporated in vacuo. The product crystallizes to afford pale yellow crystals which were vacuum dried: 29.2 g (99% yield). The compound was used without further purification. $^1$H NMR (d$_6$-DMSO): δ 6.91 (d, J=8.8 Hz, 2H), 6.48 (d, J=8.8 Hz, 2H), 5.08 (s, 2H), 3.54 (s, 3H), 3.50 (s, 6H), 3.28 (d, J=17 Hz, 2H), 3.14 (d, J=17 Hz, 2H); RP-TLC (1:1 CH$_3$OH—H$_2$O): R$_f$~0.3.

Step 3: 3-(4-Aminophenyl)-tricarballylic acid (Compound F)

Compound 11 (29 g/0.094 mol) was then dissolved in excess concentrated HCl (500 ml) and refluxed (excess HCl gas which is evolved during the initial reflux was trapped in a water trap) for 6 hours or until TLC analysis confirmed complete conversion to single spot (there are several intermediates formed along the way). Upon evaporation on the rotary evaporator at 55° C. there was obtained an amber syrup. This was high vacuum dried at 40° C. to form a solid glass which was pulverized with a spatula. Compound F was formed as a tan powder (hygroscopic): 30 g. $^1$H NMR (d$_6$-DMSO): δ 11-9.8 (broad), 7.48 (d, J=7 Hz, 2H), 7.35 (d, J=7 Hz, 2H), 3.28 (d, J=16 Hz, 2H), 3.21 (d, J=16 Hz, 2H); IR (KBr): 3450 (br), 3040 (br), 1730 (s) cm$^{-1}$; EI-MS (m/z) 266.3 (M$^+$); MS/MS 247.9; Anal. Calcd. for C$_{12}$H$_{13}$NO$_6$.(H$_2$O)$_{0.6}$ (HCl)$_{1.2}$: C, 44.78; H, 4.48; N, 4.35; Cl, 13.25. Found: C, 44.91; H, 5.04; N, 4.37; Cl, 13.24; RP-TLC (1:1 CH$_3$OH—H$_2$O): R$_f$~0.95 (during the course of the reaction, several intermediates can be observed at lower R$_f$).

Example 3

Synthesis of 4-Aminohomophthalic Acid (Compound E)

This compound was prepared in good yield by nitration of homophthalic acid (following the procedure in Ungnade, Nightingale, and French, J. ORG. CHEM., vol. 10 (1945), pp. 533-534) followed by catalytic reduction with Pd—C as detailed in Scheme 4.

Scheme 4

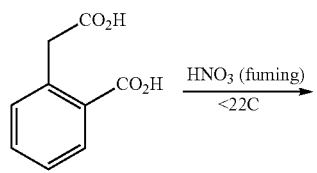

Homophthalic Acid
12

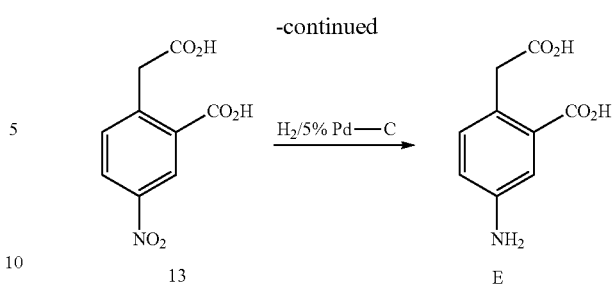

Step 1: 4-Nitrohomophthalic Acid (Compound 13)

Compound 12 (45 g/0.25 mol) was added portionwise as a powder and with magnetic stirring, to 142 ml of Fuming Nitric Acid (density 1.52) contained in an ice bath (the 3-neck round bottom flask was equipped with a calcium chloride drying tube). The addition was controlled so as to maintain a temperature <22° C. After the addition and the initial exotherm, the bath was removed and the mixture allowed to warm to room temperature and stirred for 90 minutes. The resultant mixture was cooled again in an ice bath and then cautiously treated with 500 ml of crushed ice, being careful not to allow the contents to warm above 20° C. (Alternatively, one can pour onto crushed ice.) The resulting yellow precipitate was suction filtered, washed with cold DI water, and then pulled dry. The filter cake was air dried over night to afford compound 13: 32.92 g (60% yield). $^1$H NMR (d$_6$-DMSO): δ 8.6 (s, 1H), 8.35 (d, J=8 Hz, 1H), 7.67 (d, J=8 Hz, 1H), 4.1 (s, 2H).

Step 2: 4-Aminohomophthalic Acid (Compound E)

Compound 13 (15.75 g/0.07 mol) was then dissolved in 150 ml 1N NaOH, treated with 0.55 g of 5% Pd—C and placed in a 500 ml Parr bottle. The resultant mixture was hydrogenated at 47 psi for 3 hours or until the uptake of hydrogen ceased. The solution was suction filtered through Celite, washed with a minimum amount of DI water and then acidified with c. HCl to pH 4-5. The solution was stored in the refrigerator (scratch to induce crystallization) over night. The product crystallized and was isolated by suction filtration. A second and third crop can be obtained by allowing the filtrate to slowly concentrate at room temperature. The product formed: 11 g (81% yield). $^1$H NMR (d$_6$-DMSO): δ 7.13 (s, 1H), 6.91 (d, J=8 Hz, 1H), 6.64 (d, J=8 Hz, 1H), 3.69 (s, 2H); IR (KBr): 3320-3640 (br), 1700 (s), 1550 (s) cm$^{-1}$; EI-MS (m/z) 194.1 (M$^-$); MS/MS 150; Anal. Calcd. for C$_9$H$_9$NO$_4$. (H$_2$O)$_{0.25}$: C, 54.13; H, 4.80; N, 7.02%. Found: C, 54.09; H, 5.26; N, 7.01; Na, 0.29%.

Example 4

Synthesis of 3-(4-Aminophenyl)-glutaric acd (Compound C)

Teshirogi reports a 62.4% overall yield of this compound by the synthesis shown in Scheme 5.

Scheme 5

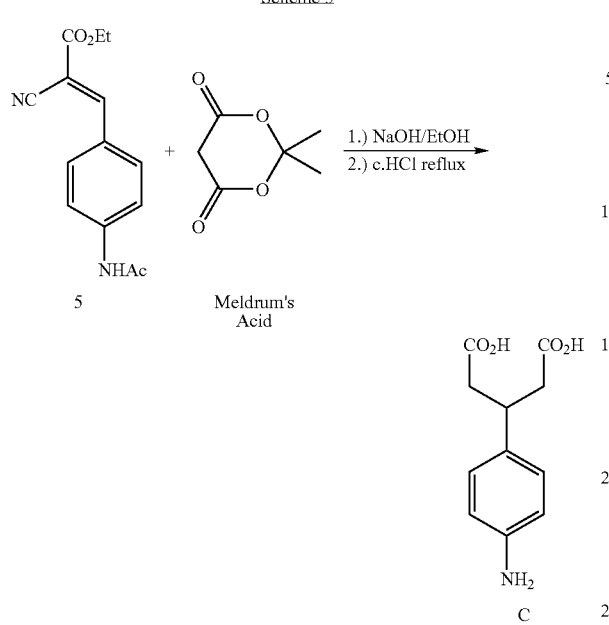

Another route that was used involved nitration of phenyl-glutaric acid followed by catalytic reduction.

Example 5

Preparation of Modified Colorants

Diazonium reactions were conducted. Two treatment levels were used for each treating molecule: 0.4 and 0.7 mmol treating agent per g carbon black. The carbon black was Black Pearls® 700 carbon black from Cabot Corporation. The following example is representative:

Carbon black was treated with Compound A prepared in Example 1 at 0.62 mmol/g. 50 g of carbon black was suspended in 441 ml of DI water and placed in a 1 L stainless steel beaker equipped with an overhead paddle stirrer. To this was added 7.6 g of compound A and the resultant stirred mixture heated to 60° C. To this rapidly stirred mixture was added 10.7 g of 20% $NaNO_2$, dropwise over several minutes (vigorous bubbling occurs with each addition). After the addition was complete, the mixture was heated at 60° C. for 3 hours. The mixture was then cooled to room temperature and the pH was 2.72. pH was adjusted to 9.25 with 1N NaOH and then the resulting dispersion diafiltered, using a peristaltic diafiltration unit equipped with a Spectrum polysulfone 0.05 micron hollow fiber membrane, with DI water for a time equivalent to 5 diafiltration volumes.

Each final dispersion was adjusted to ~15% solids and then centrifuged in a Beckman Ultracentrifuge: type 19 rotor, 4000 rpm, 10 min. After decanting from the settled pellet, this final dispersion was analyzed for % solids, UPA mv, 50%, and 100%, viscosity, surface tension, sodium by ISE, and TGA. The results are listed in Table 2.

A similar procedure was followed using compounds C, E, and F, described in Examples 4, 3, and 2 respectively. For these samples, brief sonication with a Misonix probe was used before and/or after diafiltration to reach the desired particle size. For treatment with compound A, sonication was used after diafiltration.

Print Results

The dispersions were used to prepare a number of inkjet inks. All inks were prepared at 4% pigment concentration in the formulations that are listed in Table 1 below. The TGA value was used to account for the surface chemistry. These inks were placed in their respective ink cartridges and printing was carried out in an Epson C-86, Canon i550, and/or an HP Photo Smart P-1000 inkjet printer. Six different paper types were used: Hammermill Copy Plus (HCP), Great White (GW), Xerox 4024 (X), Xerox Recycled (XR), HP Bright White (HPBW), and Epson Enhanced Matt (EEM).

For each sample ink and paper a series of black squares were printed (in the text mode—black ink only), in triplicate. The prints were analyzed on the Image Expert using an X-Rite® 938 Spectrodensitometer. From the triplicate data, average OD across the paper set were calculated and are listed in Table 3. As a control, an inkjet ink with Cabot COJ300 carbon black was used as the pigment, and was also printed.

TABLE 1

Ink formulations used in this study

| Additive | I | II | III |
| --- | --- | --- | --- |
| Surfynol 465 | 1% | 0.20% | 1% |
| Triethyleneglycol monobutylether | 5% | — | — |
| Glycerin | 10% | — | 7% |
| Diethyleneglycol | — | — | 5% |
| Trimethylolpropane | — | 5% | 7% |
| 2-Pyrrolidinone | — | 7% | — |
| 1,5-Pentanediol | — | 7% | — |
| Pigment | 4% | 4% | 4% |
| DI water | | Remainder | |

TABLE 2

Physical properties of Poly-Carboxylic treated BP700 dispersions

| Aliphatic Polyacid | Input Treatment level (mmol/g) | Solids (%) | UPA mv (microns) | UPA 50% (microns) | UPA 100% (microns) | pH | Viscosity (cP) | Surface Tension (dyne/cm) | Na+ (ppm, solid basis) | TGA (%, dry basis) |
| --- | --- | --- | --- | --- | --- | --- | --- | --- | --- | --- |
| A | 0.4 | 12.2 | 0.1662 | 0.1606 | 0.3437 | 9.3 | 3.4 | 73.8 | 7215 | 3.4 |
| After sonication--> | | 12.2 | 0.131 | 0.1243 | 0.2891 | 8.76 | | | | |
| A | 0.62 | 12.1 | 0.1887 | 0.1722 | 0.4088 | 9.23 | 3.4 | 73.1 | 10972 | 4.97 |
| After sonication--> | | 11.9 | 0.1246 | 0.1266 | 0.2891 | 9.21 | | | | |
| F | 0.4 | 12.1 | 0.1429 | 0.1393 | 0.3437 | 8.87 | 2.72 | 73.7 | 7238 | 3.94 |
| F | 0.7 | 11.7 | 0.1511 | 0.144 | 0.4088 | 8.57 | 2.06 | 72.8 | 11582 | 5.9 |
| C | 0.4 | 15.2 | 0.1442 | 0.1298 | 0.4861 | 7.77 | 3.56 | 72.6 | 5814 | 3.81 |
| C | 0.7 | 10.1 | 0.1306 | 0.1298 | 0.2891 | 7.58 | 2.2 | 72.3 | 7661 | 5.34 |
| E | 0.7 | 11.9 | 0.1429 | 0.1346 | 0.3437 | 8.43 | 2.44 | 73 | 9751 | |

TABLE 3

Print Results

| Aliphatic Polyacid | Ink Formulation | Treatment Level | Great White | HCP | Xerox Recycled | Xerox 4024 | HP Bright White | Epson Enhanced Matte | Ave. OD (all) |
| --- | --- | --- | --- | --- | --- | --- | --- | --- | --- |
| A | I | 0.62 | 1.13 | 1.20 | 1.30 | 1.28 | 1.41 | 1.61 | 1.32 |
| A | I | 0.4 | 1.07 | 1.13 | 1.22 | 1.16 | 1.36 | 1.57 | 1.25 |
| C | I | 0.7 | 1.11 | 1.20 | 1.28 | 1.24 | 1.48 | 1.61 | 1.32 |
| C | I | 0.4 | 1.04 | 1.13 | 1.19 | 1.16 | 1.39 | 1.58 | 1.25 |
| E | I | 0.7 | 1.06 | 1.24 | 1.25 | 1.20 | 1.39 | 1.56 | 1.28 |
| F | I | 0.7 | 1.05 | 1.14 | 1.27 | 1.22 | 1.36 | 1.61 | 1.28 |
| F | I | 0.4 | 1.08 | 1.15 | 1.24 | 1.21 | 1.37 | 1.58 | 1.27 |
| Comp. Ex. 1 | I | NA | 1.02 | 1.08 | 1.15 | 1.13 | 1.36 | 1.56 | 1.22 |
| A | II | 0.4 | 1.31 | 1.32 | 1.52 | 1.37 | 1.54 | 1.65 | 1.45 |
| F | II | 0.4 | 1.26 | 1.30 | 1.51 | 1.39 | 1.56 | 1.60 | 1.44 |
| C | II | 0.4 | 1.29 | 1.45 | 1.48 | 1.40 | 1.54 | 1.64 | 1.47 |
| C | II | 0.7 | 1.23 | 1.49 | 1.49 | 1.44 | 1.56 | 1.65 | 1.48 |
| Comp Ex. 1 | II | NA | 1.19 | 1.25 | 1.40 | 1.26 | 1.48 | 1.63 | 1.37 |
| C | III | 0.4 | 1.07 | 1.33 | 1.47 | 1.35 | 1.54 | 1.67 | 1.40 |
| C | III | 0.7 | 1.08 | 1.29 | 1.44 | 1.30 | 1.61 | 1.69 | 1.40 |
| Comp. Ex. 1 | III | NA | 1.07 | 1.34 | 1.46 | 1.34 | 1.50 | 1.67 | 1.40 |
| E | III | 0.7 | 1.01 | 1.09 | 1.29 | 1.17 | 1.53 | 1.67 | 1.30 |

Comp. Example 1 was an inkjet formulation containing COJ300 carbon black, which is commercially available from Cabot Corporation.

From the results above, all of the modified colorants of the present invention, comprising a pigment having attached at least one aliphatic poly-acid group afford stable dispersions with the desirable physical properties. The dispersions were made up in various ink formulations and printed on a set of papers in order to evaluate print optical density, and compared to inks made from Cab-O-Jet® 300 dispersion, available from Cabot Corporation. All of the aliphatic poly-acid-treated pigment ink gave considerably higher OD than Cab-O-Jet® 300 dispersion.

Applicants specifically incorporate the entire contents of all cited references in this disclosure. Further, when an amount, concentration, or other value parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A modified colorant comprising a colorant having attached at least one organic group, wherein said organic group includes:
   at least one $C_2$-$C_{20}$ aliphatic poly-acid group or a salt thereof, wherein said aliphatic poly-acid group comprises at least two carboxylic acid groups; and
   at least one aromatic group attached to said colorant and directly bonded to said at least one aliphatic poly-acid group.

2. The modified colorant of claim 1, wherein said aliphatic poly-acid group has a pKa value of from 2 to 7.5 for each acid group present in said aliphatic poly-acid group.

3. The modified colorant of claim 2, wherein said pKa value is from 3 to 7.

4. The modified colorant of claim 2, wherein said pKa value is from 3.5 to 6.

5. The modified colorant of claim 1, wherein said colorant is a pigment.

6. The modified colorant of claim 1, wherein said colorant is carbon black.

7. The modified colorant of claim 1, wherein said colorant is a colored pigment that is blue, black, brown, cyan, green, white, violet, magenta, red, orange, yellow, or mixtures thereof.

8. The modified colorant of claim 1, wherein said aliphatic poly-acid group comprises at least three carboxylic acid groups.

9. The modified colorant of claim 1, wherein said aromatic group is directly attached to said colorant.

10. The modified colorant of claim 1, wherein said aliphatic poly-acid group comprises a C2-C10 aliphatic group.

11. The modified colorant of claim 1, wherein said aliphatic poly-acid group comprises a group having one of the following formulas:

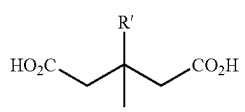

1

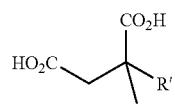

2 or a salt thereof, wherein R' is hydrogen, —$CO_2H$, a bond, an aromatic group, or an aliphatic group.

12. The modified colorant of claim 1, wherein said aliphatic poly-acid group comprises a group having one of the following formulas:

i
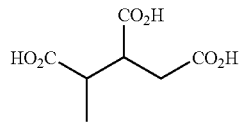

ii
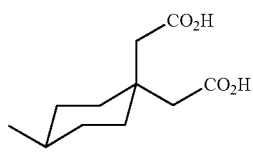

iii
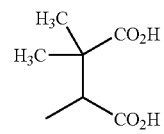

iv
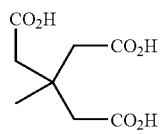

13. The modified colorant of claim 1, wherein said aliphatic poly-acid group is a phenyl-succinic acid, a phenyl-tricarballylic acid, a phenyl-glutaric acid, a homophthalic acid, or a salt thereof.

14. The modified colorant of claim 1, wherein said aliphatic poly-acid group is a 4-phenyl-succinic acid, a 3-(4-phenyl)-tricarballylic acid, a 3-(4-phenyl)-glutaric acid, a 4-homophthalic acid, or a salt thereof.

15. The modified colorant of claim 1, wherein said aliphatic poly-acid comprises one of the following groups:

A
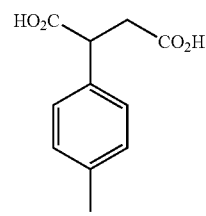

B
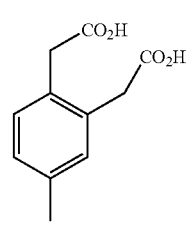

-continued

C
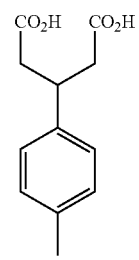

D
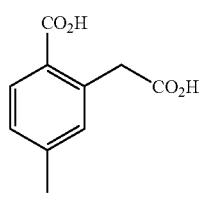

E
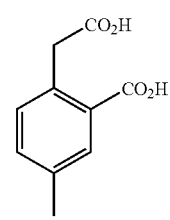

F
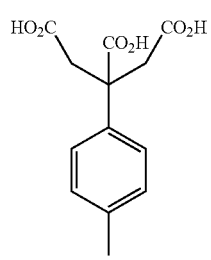

G
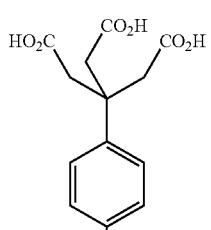

H
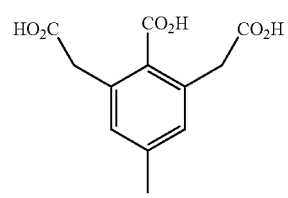

I
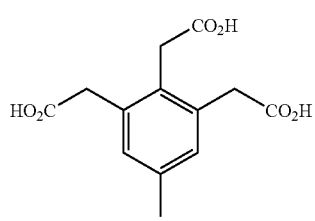

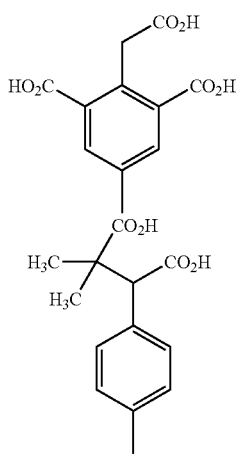

or a salt thereof.

16. An inkjet ink composition comprising at least one liquid vehicle and at least one modified colorant of claim 1.

17. An ink colorant comprising at least one liquid vehicle and at least one colorant wherein the colorant is at least the modified pigment of claim 1.

18. A method of generating a printed image comprising incorporating into a printing apparatus the inkjet ink system of claim 16, jetting the inkjet ink composition, and generating an image to a substrate.

19. The modified colorant of claim 1, wherein said colorant is a dye.

* * * * *